United States Patent [19]

Bartlett et al.

[11] Patent Number: 4,954,290

[45] Date of Patent: Sep. 4, 1990

[54] AZEOTROPES OF A HYDROGEN-CONTAINING HALOCARBON WITH PENTANES

[75] Inventors: Philip L. Bartlett; Joseph A. Creazzo, both of Wilmington; Robert A. Gorski, Newark, all of Del.

[73] Assignee: E. I. Du Pont de Nemours and Company, Wilmington, Del.

[21] Appl. No.: 366,369

[22] Filed: Jun. 12, 1989

[51] Int. Cl.$^5$ ............................ C09K 3/30; C09K 3/00
[52] U.S. Cl. ...................................... 252/305; 134/12; 134/38; 134/39; 134/40; 203/67; 252/162; 252/172; 252/350; 252/364; 521/98; 521/131; 521/155

[58] Field of Search ............... 252/305, 162, 172, 350, 252/364; 203/67; 134/12, 38, 39, 40; 521/98, 131, 155

[56] References Cited

U.S. PATENT DOCUMENTS

| | | | |
|---|---|---|---|
| 3,249,546 | 5/1966 | Eiseman | 252/DIG. 9 |
| 4,032,467 | 6/1977 | Huchinson | 252/DIG. 9 |
| 4,039,465 | 8/1977 | Huchinson | 252/DIG. 9 |
| 4,055,507 | 10/1977 | Dastur et al. | 252/DIG. 9 |
| 4,279,665 | 7/1981 | Colbert et al. | 252/DIG. 9 |
| 4,476,036 | 10/1984 | Figiel et al. | 252/DIG. 9 |

*Primary Examiner*—Morton Foelak

[57] ABSTRACT

Azeotropes of 1,1-dichloro-2,2,2-trifluoroethane with pentanes and their use as cleaning agents and foam blowing agents.

5 Claims, No Drawings

AZEOTROPES OF A HYDROGEN-CONTAINING HALOCARBON WITH PENTANES

FIELD OF THE INVENTION

This invention relates to azeotropes of 1,1-dichloro-2,2,2-trifluoroethane (HCFC-123), with n-pentane and isopentane and their use as cleaning solvents and blowing agents for polymer foams.

BACKGROUND OF THE INVENTION

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various types of polyurethane foams require expansion agents (blowing agents) for their manufacture. Insulating foams depend on the use of halocarbon blowing agents, not only to foam the polymer, but primarily for their low vapor thermal conductivity, a very important characteristic for insulation value. Historically, polyurethane foams are made with trichlorofluoromethane as the primary blowing agent.

A second important type of insulating foam is phenolic foam. These foams, which have very attractive flammability characteristics, are generally made with trichlorofluoromethane and 1,1,2-trichloro-1,2,2-trifluoroethane (CFC-113) blowing agents.

A third type of insulating foam is thermoplastic foam, primarily polystyrene foam. Polyolefin foams (polyethylene and polypropylene) are widely used in packaging. These thermoplastic foams are generally made with dichlorodifluoromethane as blowing agent.

As modern electronic circuit boards evolve toward increased circuit and component densities, thorough board cleaning after soldering becomes a more important criterion. Current industrial processes for soldering electronic components to circuit boards involve coating the entire circuit side of the board with flux and thereafter passing the flux-coated board over preheaters and through molten solder. The flux cleans the conductive metal parts and promotes solder fusion. Commonly used solder fluxes generally consist of rosin, either used alone or with activating additives, such as amine hydrochlorides and oxalic acid derivatives.

After soldering, which thermally degrades part of the rosin, the flux-residues are often removed from the circuit boards with an organic solvent. The requirements for such solvents are very stringent. Defluxing solvents should have the following characteristics: Have a low boiling point, have low toxicity and have high solvency power, so that flux and flux-residues can be removed without damaging the substrate being cleaned.

While boiling point, and solvent power characteristics can be adjusted by preparing solvent mixtures, these mixtures are often unsatisfactory because they fractionate to an undesirable degree during use. Such solvent mixtures also fractionate during solvent distillation, which makes it virtually impossible to recover a solvent mixture with the original composition.

On the other hand, azeotropes with their constant compositions, have been found to be very useful for these applications. Azeotropes do not fractionate on evaporation or boiling. These characteristics are also important when using solvent compositions to remove solder fluxes and flux-residues from printed circuit boards. Preferential evaporation of the more volatile solvent mixture components would occur if the mixtures were not azeotropes. This could result in mixtures with changed compositions and less-desirable solvency properties, such as lower resin flux solvency and lower inertness toward the electrical components being cleaned. This character is also desirable in vapor degreasing operations, where redistilled solvent is generally employed for final rinse cleaning.

Many solvent compositions used industrially for cleaning electronic circuit boards and for general metal, plastic and glass cleaning are based upon CFC-113.

In the early 1970s, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose in the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of the 1978–1987, much research was conducted to study the ozone depletion theory. Because of the complexity of atmospheric chemistry, many questions relating to this theory remained unanswered. However, assuming the theory to be valid, the health risks which would result from depletion of the ozone layer are significant. This, coupled with the fact that world-wide production of chlorofluorocarbons has increased, has resulted in international efforts to reduce chlorofluoro-carbon use. Particularly, in September, 1987, the United Nations through its Environment Programme (UNEP) issued a tentative proposal calling for a 50 percent reduction in world-wide production of fully halogenated chlorofluorocarbons by the year 1998. This proposal was ratified Jan. 1, 1989 and becomes effective on July 1, 1989.

Because of this proposed reduction in availability of fully halogenated chlorofluorocarbons such as trichlorofluoromethane, dichlorodifluoromethane and 1,1,2-trichloro-1,2,2-trifluoroethane, alternative, more environmentally acceptable, products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The accompanying Table lists the ozone depletion potential for a variety of fully and partially halogenated halocarbons. Greenhouse potential data (potential for reflecting infrared radiation (heat) back to earth and thereby raising the earth's surface temperature) are also shown.

TABLE I

| OZONE DEPLETION AND GREENHOUSE POTENTIALS | | |
|---|---|---|
| Blowing Agent | Ozone Depletion Potential | Greenhouse Potential |
| ($CFCl_3$) | 1.0 | 0.4 |
| ($CF_2Cl_2$) | 1.0 | 1.0 |
| ($CHF_2Cl$) | 0.05 | 0.07 |
| ($CF_3CHCl_2$) | 0.02 | less than 0.1 |
| ($CF_3CHFCl$) | 0.02 | less than 0.1 |
| ($CF_3CH_2F$) | 0 | less than 0.1 |
| ($CFCl_2CH_3$) | 0.1 | less than 0.1 |
| ($CF_2ClCH_3$) | 0.06 | less than 0.2 |
| ($CHF_2CH_3$) | 0 | less than 0.1 |
| ($CF_2Cl-CFCl_2$) | 0.8 | 0.3–0.8 |

Halocarbons such as $CF_3CHCl_2$, are environmentally acceptable in that they theoretically have minimal effect on ozone depletion. (Although these values have not been calculated for HCFC-123a, 1,2-dichloro-1,1,2-trifluoroethane, it is estimated that they would be similar to those for HCFC-123.)

Although 1,1-dichloro-2,2,2-trifluoroethane has definite utility as a cleaning solvent and foam blowing agent, azeotropes offer more economical systems with improved properties as non-fractionating solvents and blowing agents, while maintaining low ozone depletion potential.

Unfortunately, as recognized in the art, it is not possible to predict the formation of azeotropes.

This fact obviously complicates the search for new azeotropes which have application in the field. Nevertheless, there is a constant effort in the art to discover new azeotropic compositions, which have desirable characteristics.

SUMMARY OF THE INVENTION

According to the present invention, azeotropes of 1,1-chloro-2,2,2-trifluoroethane (HCFC-123) with n-pentane or isopentane have been discovered.

Also included in the invention are processes for using these azeotropes as cleaning agents and foam blowing agents.

The azeotropes of the present invention are minimum boiling azeotropes. Thus the boiling points of these azeotropes are lower than the boiling points of the azeotrope components. Since the boiling points of the azeotropes are lower than those for the components, the vapor pressures for the azeotropes at a particular temperature are higher than the individual component vapor pressures at that temperature.

DETAILED DESCRIPTION OF THE INVENTION

The azeotropes of the invention have the compositions as defined in the following table:

TABLE II

| Azeotropic Compositions | | |
|---|---|---|
| Components | Compositions | Boiling Points |
| HCFC-123/n-pentane | 87.0/13.0 (±3.6 wt. %) | 26.9° C. |
| HCFC-123/isopentane | 68.7/31.3 (±3.5 wt. %) | 24.3° C. |

The azeotropes of HCFC-123 and n-pentane or isopentane are useful in cleaning solvents and as blowing agents for polyurethane or phenolic foams.

Commercially available HCFC-123 may contain as much as about 20.0 wt. % 1,2-dichloro-1,1,2-trifluoroethane (HCFC-123a) which mixture is intended to be covered by the language "consisting essentially of 1,1-dichloro-2,2,2-trifluoroethane" as well as the inclusion of minor amounts of other materials which do not significantly alter the azeotropic character of the azeotrope.

EXAMPLE 1

Foam tests were conducted on a polyisocyanurate foam formulation with the azeotropes of HCFC-123 and n-pentane and isopentane. The polyisocyanurate foam formulation (250 index) is described in Table III.

The quantities of blowing agents used and the densities of the resultant foams are summarized in Table IV.

TABLE III

| POLYISOCYANURATE FOAM* | | |
|---|---|---|
| Ingredient | Equivalent Weight | Weight Used, g |
| Polyester polyol[a] | 197.0 | 100.0 |
| DC-193[b] | | 1.5 |
| Hex-Cem ® 977[c] | | 2.7 |
| TMR-30[d] | | 0.3 |
| Isocyanate (MDI)[e] | 136.5 | 179.2 |
| Blowing Agent | | f |

*250 Index polyisocyanurate foam.
[a]Stepanpol ® PS-2852 (Stepan Company) an aromatic polyester polyol.
[b]Silicone surfactant (Dow Corning Corporation).
[c]Potassium octanoate (Mooney Chemicals, Incorporated).
[d]Dabco ® tris (Dimethylaminomethyl) phenol (Air Products and Chemicals, Incorporated).
[e]PAPI-580 (Dow Chemical Company) methylene diisocyanate.
[f]CFC-11 is used as the reference blowing agent. The quantities of CFC-11 and HCFC-123/n-pentane or isopentane azeotropes employed are shown in Table IV.

TABLE IV

| POLYISOCYANURATE FOAMS | | |
|---|---|---|
| Blowing Agent* | Wt. % | Foam Density lb./cu. ft. |
| CFC-11 | 13.4 | 2.02 |
| HCFC-123 | 14.8 | 2.66 |
| n-Pentane | 7.0 | 2.25 |
| Isopentane | 7.0 | 2.52 |
| HCFC-123/n-pentane | 11.3/1.8 | 2.19 |
| HCFC-123/isopentane | 7.7/3.6 | 2.12 |

*Each blowing agent or azeotrope was used at a concentration which would result in essentially the same number of moles of gas as represented by 13.4 wt. % CFC-11. The foams prepared with the HCFC-123 azeotropes were excellent (fine/uniform cell size) closed-cell foams; whereas, the hydrocarbon foams were very coarse, non-uniform in cell size. The HCFC-123 foams showed evidence of shrinkage with aging.

EXAMPLE 2

Solubility tests were performed on n-pentane, isopentane and the HCFC-123 azeotropes with n-pentane and isopentane in a polyisocyanurate foam B-side system. A B-side system contains all of the ingredients required to prepare a polyisocyanurate foam, except the isocyanate. It is industry practice to prepare polyisocyanurate foams by mixing a B-side system with the appropriate quantity of isocyanate. The test data (Table V) show the insolubility of n-pentane and isopentane in the B-side system. HCFC-123 and the azeotropes of HCFC-123 with n-pentane and isopentane are readily soluble in the B-side system.

TABLE V
BLOWING AGENT SOLUBILITY DATA

| Blowing Agent | Weight % in B-Side System* | Appearance |
| --- | --- | --- |
| CFC-11 | 37.4 | Milky, separates on standing |
| HCFC-123 | 41.3 | Clear solution |
| n-Pentane | 19.5** | Milky, separates on standing |
| Isopentane | 19.5** | Milky, separates on standing |
| HCFC-123/n-pentane (87.0/13.0) | 36.6 | Clear solution |
| HCFC-123/isopentane (68.7/31.3) | 31.5 | Clear solution |

*B-side system includes all foam ingredients shown in Table I, except the isocyanate. The concentrations of blowing agents used are those which yield the desired concentrations in the final foam as shown in Table IV.
**Concentrations of >1.0 wt. % n-pentane or isopentane in B-side system are hazy, indicating poor solubility.

EXAMPLE 3

Cleaning tests were performed on single-sided circuit boards and nut-washer assemblies using HCFC-123/n-pentane (87.0/13.0) and HCFC-123/isopentane (68.7/31.3). The results are shown in Table VI.

TABLE VI
CLEANING TESTS

| Solvents | Substrate | Results |
| --- | --- | --- |
| HCFC-123/n-pentane (87.0/13.0) | Single-sided circuit boards[a] | Boards cleaned with no visible residue |
| HCFC-123/n-pentane (87.0/13.0) | Nuts/washers assemblies[b] | Cleaned, no oil |
| HCFC-123/isopentane (68.7/31.3) | Single-sided boards | Boards cleaned with no visible residue |
| HCFC-123/isopentane (68.7/31.3) | Nuts/washers | Cleaned, no oil |

[a]Boards fluxed with activated rosin, preheated to 200° F., and soldered at 500° F. prior to cleaning.
[b]Assemblies dipped in Oak Drawing Oil No. 78-1 prior to cleaning.

We claim:

1. An azeotropic composition consisting essentially of a member of the group consisting of 83.4 to 90.6 member percent 1,1-dichloro-2,2,2trifluoroethane and 9.4 to 16.6 weight percent n-pentane; and 65.2 to 72.2 weight percent 1,1-dichloro-2,2,2-trifluoroethane and 27.8 to 34.8 weight percent isopentane.

2. An azeotropic composition of claim 1 consisting essentially of from 83.4 to 90.6 weight percent 1,1-dichloro-2,2,2-trifluoroethane and 9.4 to 16.4 weight pcercent n-pentane.

3. An azeotropic composition of claim 1 consisting essentially of from 65.2 to 72.2 weight percent 1,1-dichloro-2,2,2-trifluoroethane and 27.8 to 34.8 weight percent isopentane.

4. An azeotropic composition of claim 1 consisting essentially of about 87 weight percent 1,1-dichloro-2,2,2-trifluoroethane and about 13 weight percent n-pentane.

5. An azeotropic composition of claim 1 consisting essentially of about 68.7 weight percent 1,1-dichloro-2,2,2-trifluoroethane and about 31.3 weight percent isopentane.

* * * * *